(12) United States Patent
Lippincott

(10) Patent No.: US 6,459,825 B1
(45) Date of Patent: Oct. 1, 2002

(54) METHOD AND APPARATUS FOR A SELF LEARNING AUTOMATIC CONTROL OF PHOTO CAPTURE AND SCANNING

(76) Inventor: Phillips M. Lippincott, 24411 Mockingbird Pl., Lake Forest, CA (US) 92630

( * ) Notice: Subject to any disclaimer, the term of this patent is extended or adjusted under 35 U.S.C. 154(b) by 0 days.

(21) Appl. No.: 09/252,872

(22) Filed: Feb. 18, 1999

(51) Int. Cl.[7] ................................................ G06K 7/00
(52) U.S. Cl. ...................... 382/312; 358/504; 382/155
(58) Field of Search ................................ 358/487, 443, 358/474, 406, 475, 504, 505, 518, 527, 516; 382/312, 155, 156, 162

(56) References Cited

U.S. PATENT DOCUMENTS

| | | | | |
|---|---|---|---|---|
| 5,543,925 A | * | 8/1996 | Timmermans | 358/310 |
| 5,862,297 A | * | 1/1999 | Timmermans | 386/70 |
| 6,021,277 A | * | 2/2000 | Sowinski | 396/6 |
| 6,023,347 A | * | 2/2000 | Hoshino | 358/487 |
| 6,274,299 B1 | * | 8/2001 | Buhr | 430/359 |

* cited by examiner

Primary Examiner—Jerome Grant, II

(57) ABSTRACT

A real-time automatic image scanning system for optimizing the optical quality properties of photographic image digital capture, utilizing a knowledge database containing photo and scanner calibration standardized properties 22 and utilized during scanning operations. The actual photo media being scanned is pre-sampled and compared to the available known characteristics for said photo media 116. Media selection is automatically detected and deviations in color response and exposure from the standard are analyzed and optimized to those settings available from the scanner device properties. The scanner is then instructed to perform a scan of the photo media according to the now optimized custom photo media values with automatic adjustment to match the available scanner hardware optical properties 20. The raw image data directly returned from the scanner are optimized to the film media type's natural optical resolution, color fidelity, and focus requirements, having been matched to the capabilities of the scanner.

3 Claims, 9 Drawing Sheets

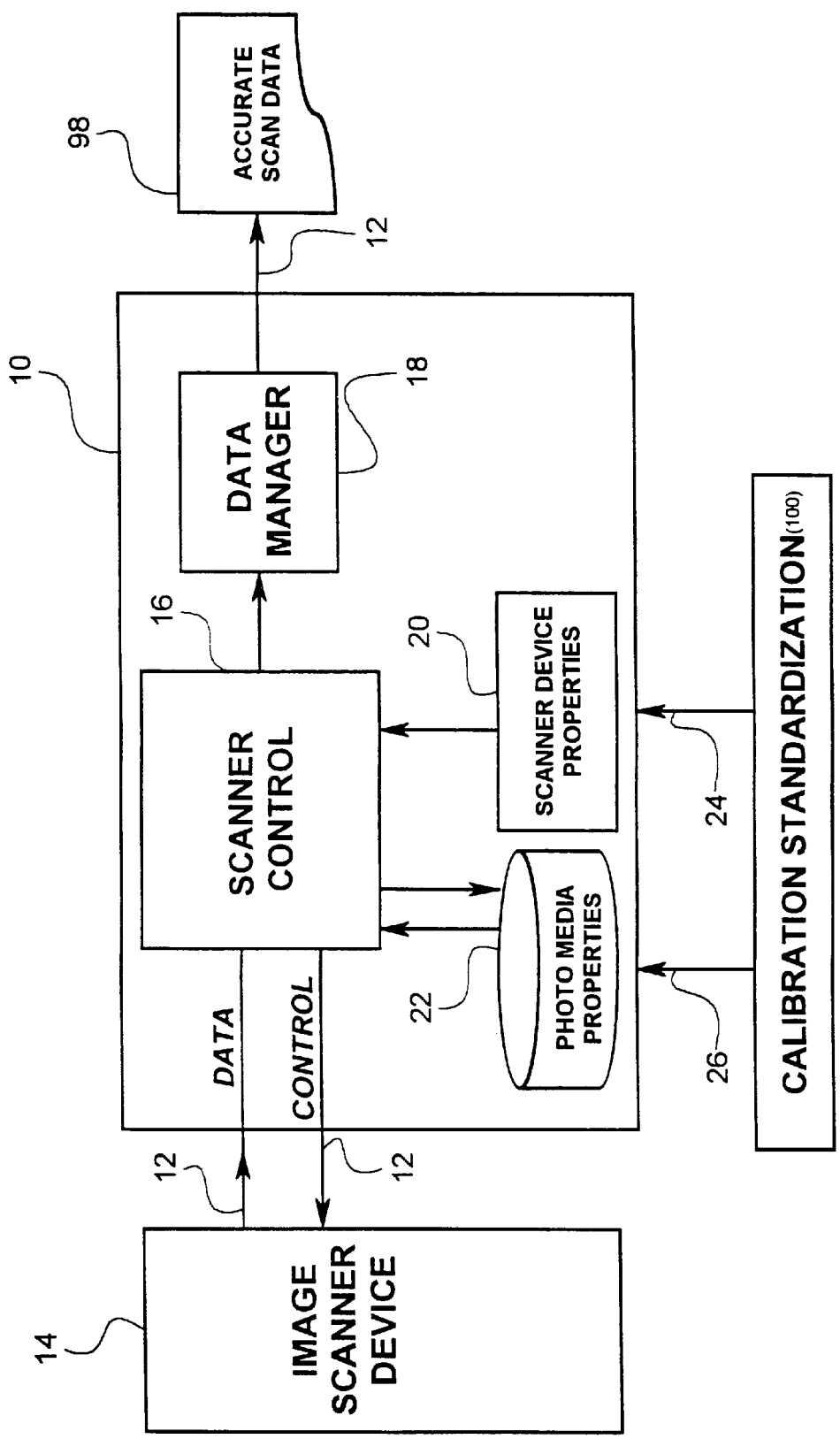
FIG. 1 OVERVIEW

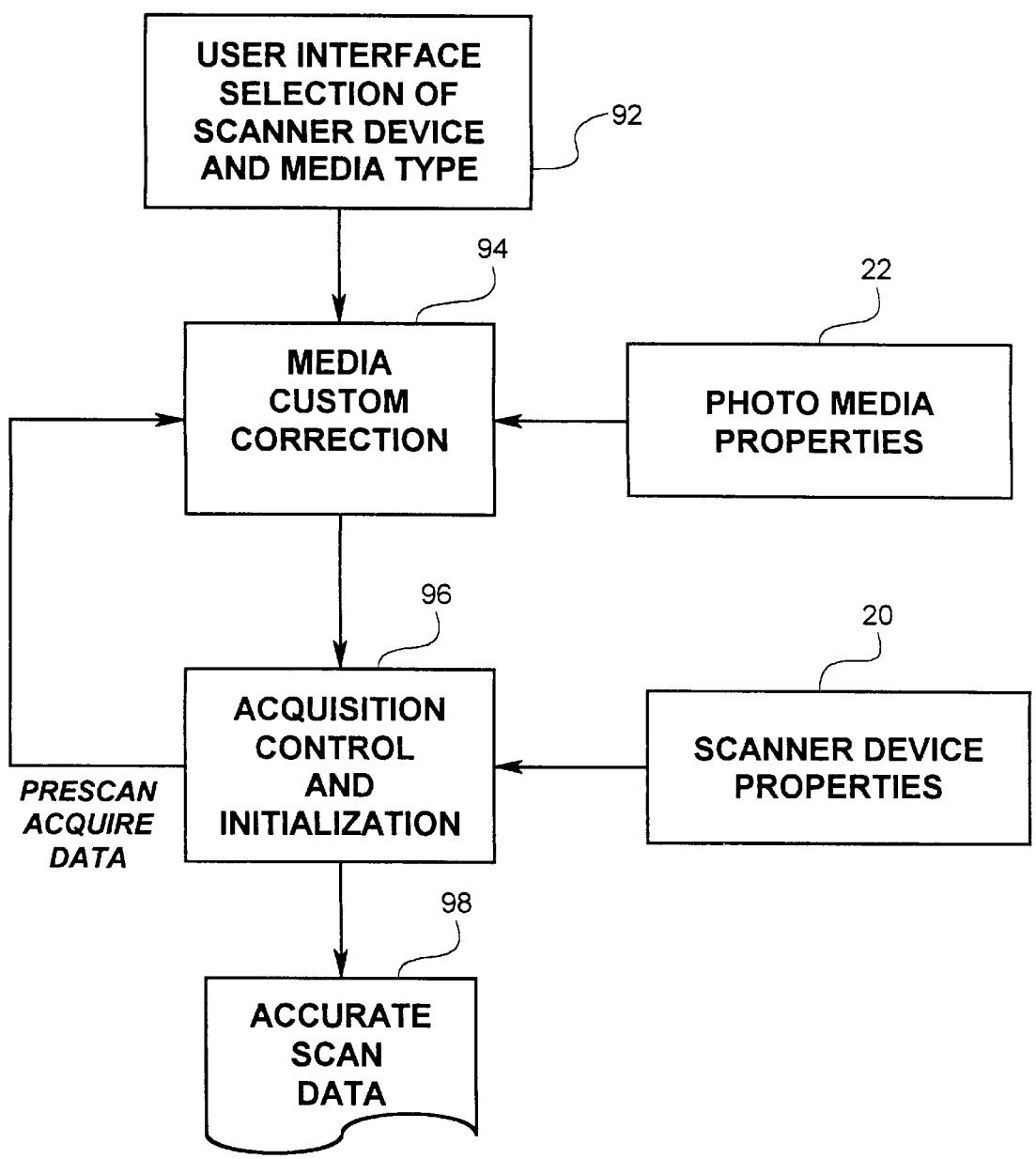
FIG. 2  SCANNER CONTROL (16)

FIG. 3  CALIBRATION STANDARDIZATION  (100)
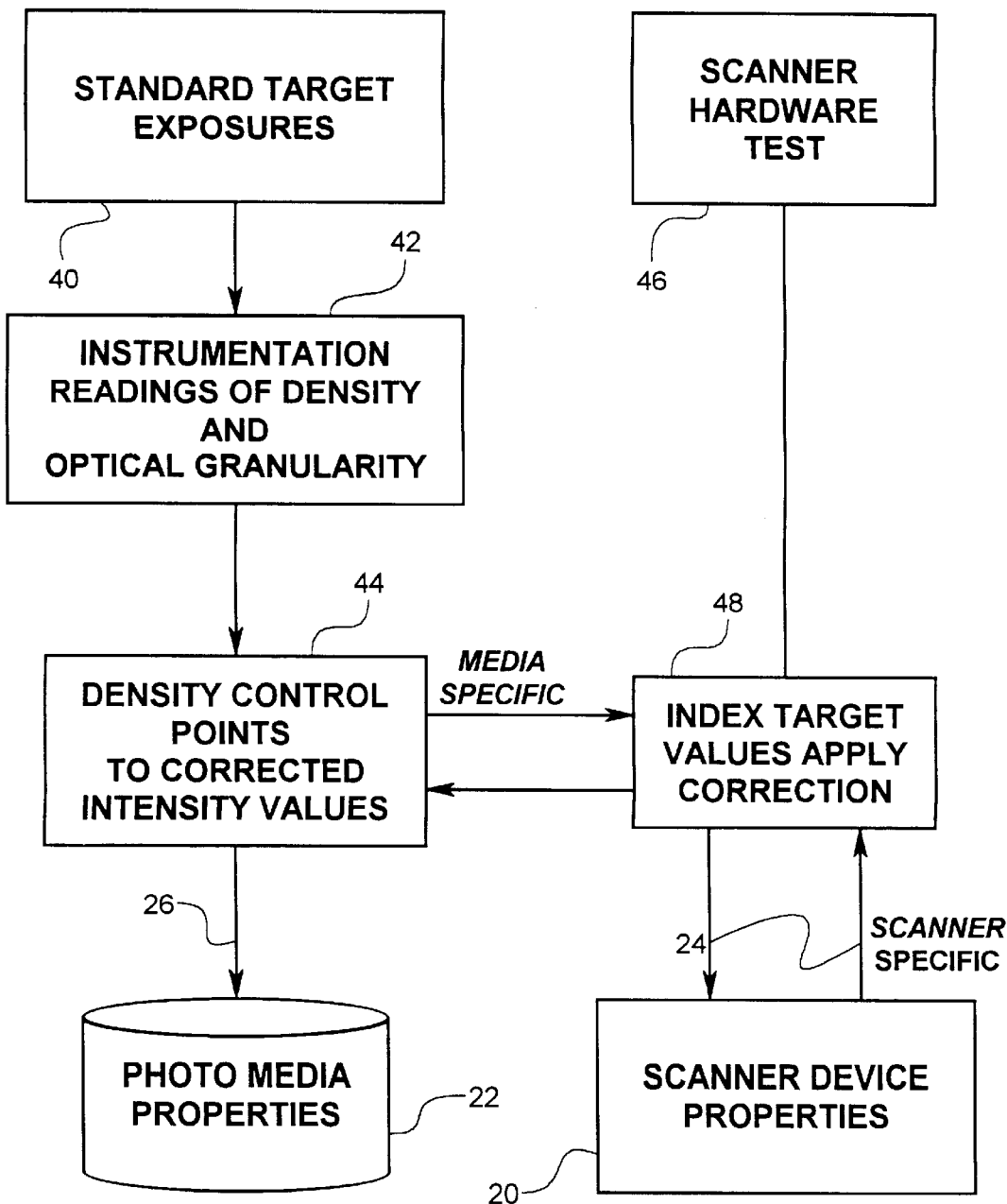

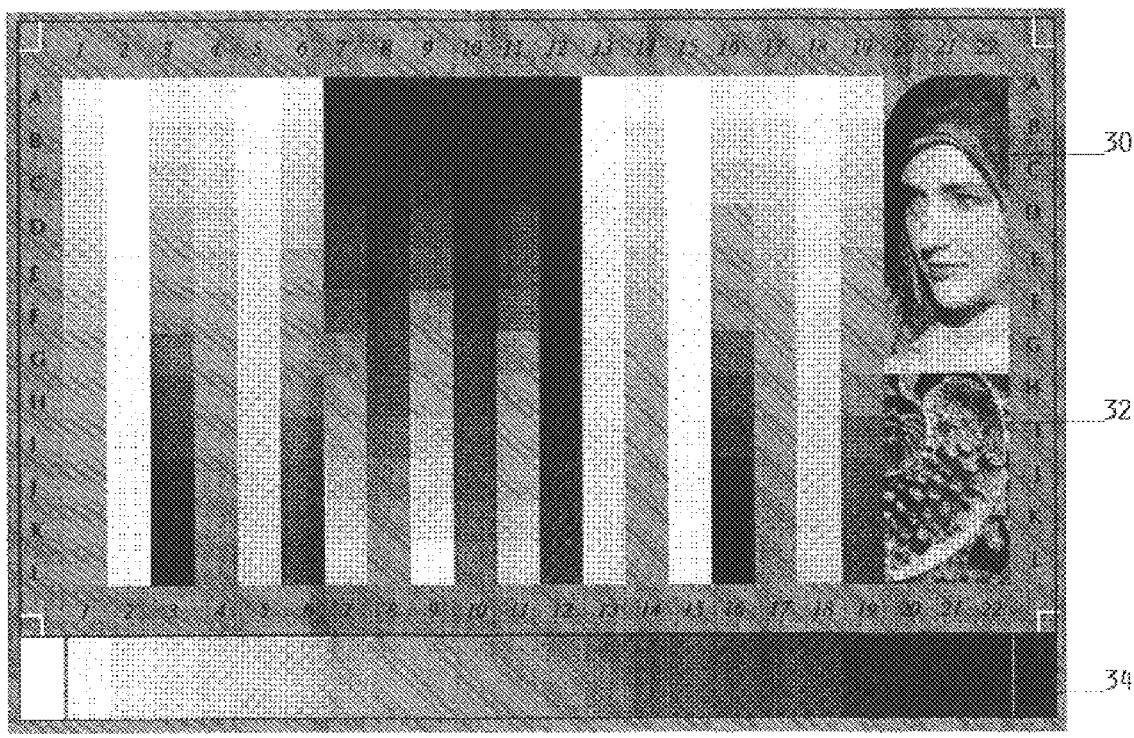
FIG. 4 STANDARIZED TARGET

FIG. 5  PHOTO MEDIA PROPERTIES (22)

70—Film Characterization: KDKGoldPlusN
    REM: Copyright All Rights Reserved,
    P.M.Lippincott, 1990
    DESCRIPTION: Kodak Negative Gold
    Plus 100
72—Media Group: Kodak Gold +
    DEVICE TYPE: 3200 degree Kelvin
74—GRAIN: 65
76—DENSITY Mask One: Dmin=1.38
    Dmid=.60 Dmax=.23
    DENSITY Mask Two: Dmin=1.81
    Dmid=.92 Dmax=.57
    DENSITY Mask Three: Dmin=2.36
    Dmid=1.24 Dmax=.79
78—Type of senstometryl; Status M
    DENSITY,RGB,TRANSPARENT,NEG.
80—Channel One Control Points: 49
    Value: 0 0.721569 1.000000
    Value: 1 0.725490 0.988235
    Value: 2 0.729412 0.976471
    Value: 3 0.733333 0.964706
    Value: 4 0.737255 0.949020
    Value: 5 0.741176 0.933333
    Value: 6 0.745098 0.913725
    Value: 7 0.749020 0.894118
    Value: 8 0.752941 0.870588
    Value: 9 0.756863 0.847059
    Value: 10 0.760784 0.823529
    Value: 11 0.764706 0.796078
    Value: 12 0.768627 0.768627
    Value: 13 0.772549 0.737255
    Value: 14 0.776471 0.701961
    Value: 15 0.780392 0.670588
    Value: 16 0.784314 0.635294
    Value: 17 0.788235 0.600000
    Value: 18 0.792157 0.564706
    Value: 19 0.796078 0.529412
    Value: 20 0.800000 0.498039
    Value: 21 0.803922 0.462745
    Value: 22 0.807843 0.447059
    Value: 23 0.811765 0.431373
    Value: 24 0.815686 0.396078
    Value: 25 0.819608 0.360784
    Value: 26 0.823529 0.345098
    Value: 27 0.827451 0.329412
    Value: 28 0.831373 0.294118
    Value: 29 0.835294 0.278431
    Value: 30 0.839216 0.262745
    Value: 31 0.843137 0.235294
    Value: 32 0.847059 0.219608
    Value: 33 0.850980 0.203922
    Value: 34 0.854902 0.180392
    Value: 35 0.858824 0.156863
    Value: 36 0.862745 0.145098
    Value: 37 0.866667 0.133333
    Value: 38 0.870588 0.109804

Value: 39 0.874510 0.101961
Value: 40 0.878431 0.090196
Value: 41 0.882353 0.074510
Value: 42 0.886275 0.054902
Value: 43 0.890196 0.047059
Value: 44 0.894118 0.039216
Value: 45 0.898039 0.023529
Value: 46 0.901961 0.023529
Value: 47 0.905882 0.011765
Value: 48 0.909804 0.000000
Channel Two Control Points: 64
Value: 0 0.556863 1.000000
Value: 1 0.560784 0.988235
Value: 2 0.564706 0.984314
Value: 3 0.568627 0.976471
Value: 4 0.572549 0.964706
Value: 5 0.576471 0.949020
Value: 6 0.580392 0.933333
Value: 7 0.584314 0.921569
Value: 8 0.588235 0.913725
Value: 9 0.592157 0.894118
Value: 10 0.596078 0.870588
Value: 11 0.600000 0.858824
Value: 12 0.603922 0.847059
Value: 13 0.607843 0.823529
Value: 14 0.611765 0.796078
Value: 15 0.615686 0.784314
Value: 16 0.619608 0.768627
Value: 17 0.623529 0.737255
Value: 18 0.627451 0.701961
Value: 19 0.631373 0.670588
Value: 20 0.635294 0.635294
Value: 21 0.639216 0.615686
Value: 22 0.643137 0.600000
Value: 23 0.647059 0.564706
Value: 24 0.650980 0.529412
Value: 25 0.654902 0.513725
Value: 26 0.658824 0.498039
Value: 27 0.662745 0.478431
Value: 28 0.666667 0.462745
Value: 29 0.670588 0.431373
Value: 30 0.674510 0.411765
Value: 31 0.678431 0.396078
Value: 32 0.682353 0.380392
Value: 33 0.686275 0.360784
Value: 34 0.690196 0.345098
Value: 35 0.694118 0.329412
Value: 36 0.698039 0.313725
Value: 37 0.701961 0.298039
Value: 38 0.705882 0.278431
Value: 39 0.709804 0.262745
Value: 40 0.713725 0.247059
Value: 41 0.717647 0.235294
Value: 42 0.721569 0.219608
Value: 43 0.725490 0.203922
Value: 44 0.729412 0.180392

Value: 45 0.733333 0.168627
Value: 46 0.737255 0.156863
Value: 47 0.741176 0.145098
Value: 48 0.745098 0.133333
Value: 49 0.749020 0.121569
Value: 50 0.752941 0.109804
Value: 51 0.756863 0.101961
Value: 52 0.760784 0.090196
Value: 53 0.764706 0.082353
Value: 54 0.768627 0.074510
Value: 55 0.772549 0.062745
Value: 56 0.776471 0.054902
Value: 57 0.780392 0.039216
Value: 58 0.784314 0.031373
Value: 59 0.788235 0.023529
Value: 60 0.792157 0.019608
Value: 61 0.796078 0.011765
Value: 62 0.800000 0.007843
Value: 63 0.803922 0.000000
Channel Three Control Points: 35
Value: 0 0.462745 1.000000
Value: 1 0.470588 0.988235
Value: 2 0.478431 0.968627
Value: 3 0.486275 0.949020
Value: 4 0.494118 0.933333
Value: 5 0.501961 0.905882
Value: 6 0.509804 0.870588
Value: 7 0.517647 0.847059
Value: 8 0.525490 0.811765
Value: 9 0.533333 0.784314
Value: 10 0.541176 0.737255
Value: 11 0.549020 0.701961
Value: 12 0.556863 0.650980
Value: 13 0.564706 0.600000
Value: 14 0.572549 0.564706
Value: 15 0.580392 0.513725
Value: 16 0.588235 0.478431
Value: 17 0.596078 0.447059
Value: 18 0.603922 0.411765
Value: 19 0.611765 0.380392
Value: 20 0.619608 0.329412
Value: 21 0.627451 0.305882
Value: 22 0.635294 0.278431
Value: 23 0.643137 0.247059
Value: 24 0.650980 0.219608
Value: 25 0.658824 0.180392
Value: 26 0.674510 0.133333
Value: 27 0.682353 0.109804
Value: 28 0.690196 0.090196
Value: 29 0.698039 0.074510
Value: 30 0.705882 0.054902
Value: 31 0.713725 0.039216
Value: 32 0.721569 0.023529
Value: 33 0.729412 0.011765
Value: 34 0.737255 0.000000

FIG. 6a  SCANNER DEVICE DEPENDANT PROPERTIES (20)

///SCANNER DEVICE DEPENDANT PROPERTIES

```
#include "userinterface.h"
#include "scanner.h"
#include "scsiscan.h"
#define DllExport __declspec( dllexport )
extern "C"
{
        BOOL DllExport GetScannerConfiguration(SCANNER *ThisScanner);
}
BOOL DllExport GetScannerConfiguration(SCANNER *ThisScanner)
{
        ThisScanner->ScannerType=4500;
        strcpy(ThisScanner->ScannerName,"4500");
60 ——  strcpy(ThisScanner->VendorID,"HOWTEK");
        ThisScanner->NumberOfProductID = 1;
62 ——  strcpy(ThisScanner->ProductID[0],"4500");
        strcpy(ThisScanner->DeviceType,"PMT DRUM");
        ThisScanner->NumberOpticalResolutions=12;
        ThisScanner->DPI_resolutions[0] = 100;
        ThisScanner->DPI_resolutions[1] = 200;
        ThisScanner->DPI_resolutions[2] = 250;
        ThisScanner->DPI_resolutions[3] = 307;
        ThisScanner->DPI_resolutions[4] = 400;
        ThisScanner->DPI_resolutions[5] = 500;
        ThisScanner->DPI_resolutions[6] = 666;
        ThisScanner->DPI_resolutions[7] = 800;
        ThisScanner->DPI_resolutions[8] = 1000;
        ThisScanner->DPI_resolutions[9] = 1333;
64 <    ThisScanner->DPI_resolutions[10]= 2000;
        ThisScanner->DPI_resolutions[11]= 4000;
        ThisScanner->MM_resolutions[0] = (float) 3.94;
        ThisScanner->MM_resolutions[1] = (float) 7.88;
        ThisScanner->MM_resolutions[2] = (float) 9.84;
        ThisScanner->MM_resolutions[3] = (float) 12.09;
        ThisScanner->MM_resolutions[4] = (float) 15.75;
        ThisScanner->MM_resolutions[5] = (float) 19.69;
        ThisScanner->MM_resolutions[6] = (float) 26.22;
        ThisScanner->MM_resolutions[7] = (float) 31.50;
        ThisScanner->MM_resolutions[8] = (float) 39.77;
        ThisScanner->MM_resolutions[9] = (float) 52.48;
        ThisScanner->MM_resolutions[10]= (float) 78.74;
        ThisScanner->MM_resolutions[11]= (float) 157.48;
```

FIG. 6 b

```
66 ⎯⎯ ThisScanner->NumberOfApertures=12;
        ThisScanner->Apertures[0]  = 254;
        ThisScanner->Apertures[1]  = 127;
        ThisScanner->Apertures[2]  = 102;
        ThisScanner->Apertures[3]  = 83 ;
        ThisScanner->Apertures[4]  = 64 ;
        ThisScanner->Apertures[5]  = 51 ;
        ThisScanner->Apertures[6]  = 38 ;
        ThisScanner->Apertures[7]  = 32 ;
        ThisScanner->Apertures[8]  = 25 ;
        ThisScanner->Apertures[9]  = 19 ;
        ThisScanner->Apertures[10] = 13 ;
        ThisScanner->Apertures[11] = 6  ;

ThisScanner->ScannerDLL = DRUM_DLL;
        ThisScanner->ScannerID = caID4500;
        ThisScanner->FullScanArea.minx=0;
        ThisScanner->FullScanArea.miny=0;
68 ⎯⎯ ThisScanner->FullScanArea.maxx=10399;
        ThisScanner->FullScanArea.maxy=11799;
70 ⎯⎯ ThisScanner->LUTValues=4096;
        ThisScanner->LUTRange=4096/16768000;
        ThisScanner->MinimumOpticalResolution=31/4dpm;
        ThisScanner-MaximumOpticalResolution=4000/157dpm;
72 ⎯⎯ ThisScanner->CurrentMode=TrueColor_48Bit;
        ThisScanner->ScannerUnitDivisor=1000;
74 ⎯⎯ ThisScanner->SupportAutoFocus=1;
        ThisScanner->ScannerMedia=MEDIA_Transparency_Linear;
76 ⎯⎯ ThisScanner->LinePacking = SCSI_PIXEL_PACKED;
        ThisScanner->Swap       = SCSI_INTEL_DATA;
        ThisScanner->Color  = 0;
        ThisScanner->Bits   = 16;
   return TRUE;
 }
  BOOL WINAPI DllEntryPoint(HINSTANCE hinstDLL, // handle to DLL module
                DWORD fdwReason,    // reason for calling function
                LPVOID lpReserved )  // reserved
 {
 // Perform actions based on the reason for calling.
    switch(fdwReason)
         {
           case DLL_PROCESS_ATTACH:
```

FIG. 6c

```
        break;
        case DLL_THREAD_ATTACH:
        break;
        case DLL_THREAD_DETACH:
break;
        case DLL_PROCESS_DETACH:
break;
        }
return TRUE;  // Successful DLL_PROCESS_ATTACH.
}
```

FIG. 7 MEDIA CUSTOM CORRECTIONS (94)
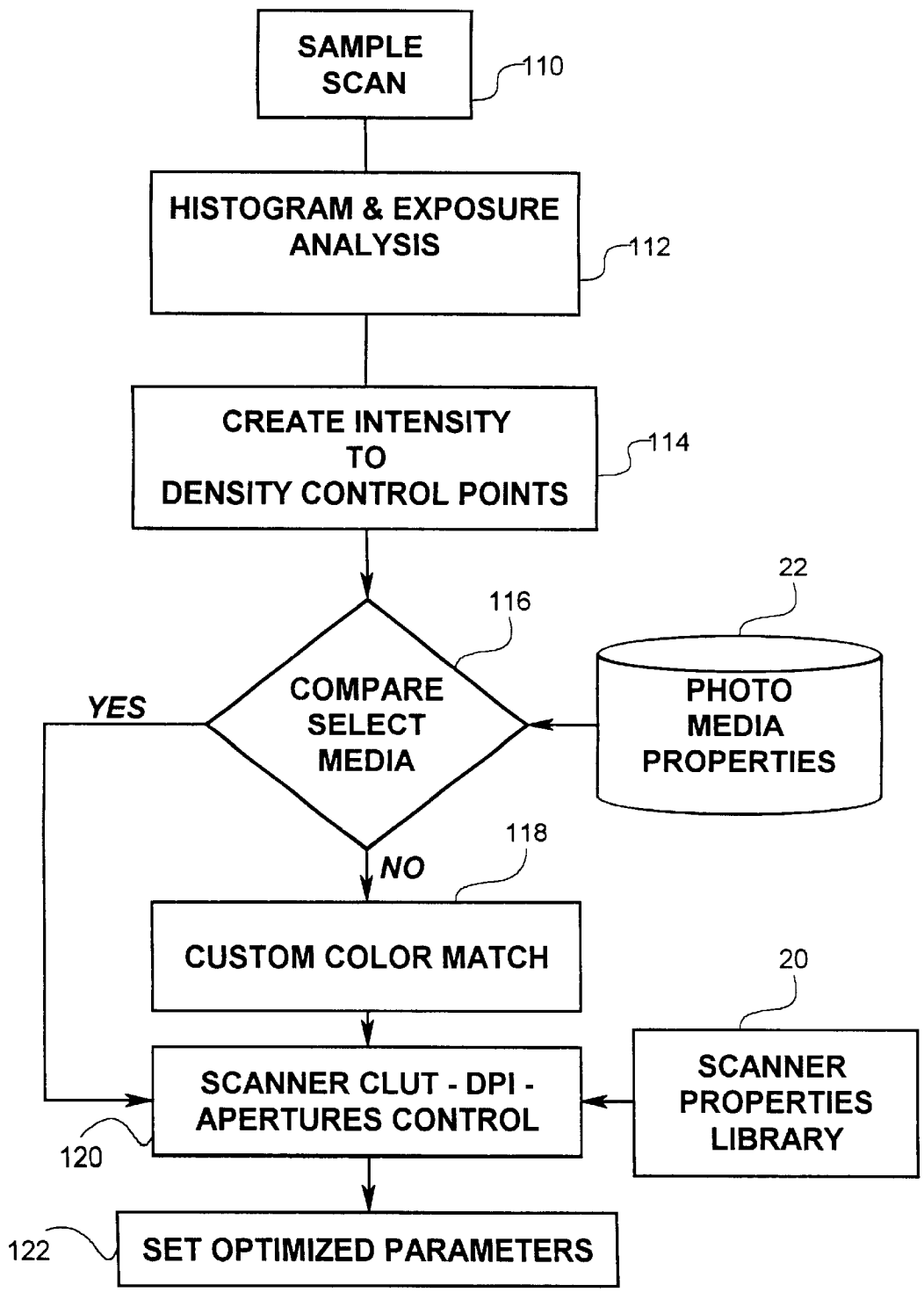

METHOD AND APPARATUS FOR A SELF LEARNING AUTOMATIC CONTROL OF PHOTO CAPTURE AND SCANNING

CROSS-REFERENCE TO RELATED APPLICATIONS

Not applicable.

BACKGROUND

1. FIELD OF INVENTION

The invention relates to apparatus and methods of automated photo image scanning for photo reprographics from various slide transparency, negative film, and reflective print media. More particularly, the invention is directly applicable to demanding photo-optical applications where scanner equipment is required to image capture at the highest quality image resolution and fidelity possible.

2. DESCRIPTION OF RELATED ART

Analog film with its infinite color representation and optical emulsion continuous tone fidelity has been traditionally an extremely good source for high quality image reproduction. This work, historically, was performed by analog photo optical techniques. For instance, one extreme example is the case of film placed in a large optical projection camera, which is then constructed into a large darkroom, and optically exposing to large format photo paper. This kind of application for film has for years been used to create many of today's photo KIOSKS or large format photo advertising banners. Other high quality photography and film applications have included school and portrait photography, pre press, motion pictures, and thousands of other professional uses of film as tooling for image reproduction.

It has always been an industry difficulty, even before the advent of digital imaging, to obtain accurate photo reproduction color and optical quality. This gave rise to the use of video cameras and scanners as colorimeters for determining the corrected values to be used in the analog reproduction process. U.S. Pat. No. 3,893,166 to Pugsley (1975). Color correcting image reproduction method and apparatus.

With the advent and proliferation in recent years of digital imaging output devices, the demand for the higher quality and speed of digital scanning has grown. In general, the tools have not been up to the quality standards for many of the tasks. The highest state of the art has been for a skilled scanner operator to use personal judgement to scan film positive transparencies (slide film). The operator interacts on a computer workstation, with a color monitor, to select scanner parameters and create digital image data files. U.S. Pat. No. 5,155,588 to Levien (1992) discloses a color correction and apparatus for photographic reproduction.

The limitations of this approach are due to many factors. First, the entire approach depends on human judgement, utilizing an inaccurate color monitor to subjectively balance color and set resolution and optical control parameters. The actual quality results will not be totally visible until after printing the media. Additionally, due to the combination of the density to sensitivities of the film with the intensity variations of a scanner, the highest quality processes are limited to only a bump function and only applicable to positive transparency film.

Thereafter, inventors created calibration techniques for color calibrating scanners to attempt to compensate for exposure control with test reflective photography. U.S. Pat. No. 5,721,811 to Eckhardt (1998) discloses a pre press system color control technique which can only scan slide transparencies utilizing an instant color photograph as a photo color reference for lighting conditions. This inventor states that photographic color film transparencies are exclusively used because using negatives with color would add complexity, loss of sharpness, and color distortion to the process. Photo prints are generally inadequate because the image print resolution quality is much lower than film. Negative film is not often used because the scanner and computer equipment is not up to the task. More than 90% of all film sold and used is negative film, yet none of these materials are currently suitable for the high quality digital image reproduction process because of scanning limitations. Negative film densities are reversed, offset in yellow, magenta, and cyan dye densities, and very compressed between the representatives of information content between black and white. Typical spectral density distribution compression is between 35 and 50%, (depending on the type of negative film), making digitizing negative film very sensitive to computer error.

Computer scanners are typically manufactured with log curves built into the equipment in order to approximate (only) film response and to display attractive results to video gamma devices including computer monitors. However, all photo film dye densities are characterized not by log curves, but more generally "S" shaped curves that are unique to each material, with shadow and highlight detail fall off. Thus, spectral response shadow and highlight details are damaged or lost with log curve scanning.

The digital fidelity scanning color depth process, to the computer from the scanner, is typically controlled by a 24-bit to 36-bit color lookup table (analog to digital converter), and a 24-bit color depth (16.7 million available colors). The color spectral compression of negative film densities has the effect of reducing the scanner intensity data space to be reduced by 35%–50% of the digital domain of the scanner. Therefore, the 24-bit data space is reduced to representative values of between approximately 16 to 12-bit. Thus, the available photo image color space is reduced from the infinite number available on the analog negative film, and the 16.7 million potential colors of the scanner, to the lowest common film to scanner intensity response of the film density. That is between 65,535 to 4096 individual digital color representation for 16 to 12-bit respectively. This often causes visible posterization or duplications of colors in digital image scans of negative film.

Further complicating the photo-media scanner technology state of the art is the fact that not only is every film stock media different in the dye or ink stock that it is formulated with, but also each photographer's individual exposure of the film can have slight differences in light levels. With highly sensitive films (especially negatives) the color correction curves for each different exposure varies significantly. Therefore, standardized color corrections are not enough to avoid the problems of serious color shifts and aberrations in the results. U.S. Pat. No. 5,475,493 to Yamana (1995) discloses a gray balance correcting method to address this problem. The limitation of this approach is that it is based solely on three points, white/Dmin, black/Dmax, and gray densities. Due to the digital domain data sensitivity issues previously mentioned, it is necessary to have all the data values possible, both to avoid color distortion and to digitally capture to support the full fidelity of the film's spectral data.

Two types of image processing generalized analysis methods have been proposed. The first, U.S. Pat. No. 5,200,816 to Rose (1993), provides for color processing with learned neural networks based on utilizing KODAK Q60 Targets as a scanner reference. This proposal, based on its dependency on the ISO IT8 sub-committee target standards, as a result lacks all reference to primary colors of red, green, blue, magenta, yellow, and cyan between black and their fully saturated color representation. Additionally, neither KODAK nor other sources provide this target on any photo media except on limited varieties of positive (SLIDE) transparencies and print paper. Thus, the referenced learning color method lacks access and methodology for the color fidelity information necessary for the most demanding applications and is not applicable to negative film altogether.

The second, U.S. Pat. No. 5,748,773 to Tashiro (1998), is a laser copy machine pre-scan operation that detects the material type by looking for a predetermined set of color feature points from the formed histogram of the pre-scan. By comparing the sampled feature points to a second set of feature points, it then converts the data to a third color feature points set. Although pre-sampling the media and performing a histogram analysis gives important artificial intelligence data, how the pre-sample data is used is of equal or even more importance. The proposal is limited in its ability to totally reproduce the accuracy of the analog film because there is a fundamental lack of the complete film characterization knowledge necessary before a sample is taken. In this invention, the sample is used based only on a limited number of feature points for a scan. This approach does not yield an adequate fidelity of information to support the quality necessary for applications demanding film accuracy.

Beyond these discussed color reproduction problems; high quality digital scanning from film is also hampered by the optical film emulsion formulation of its film's grain structure. Each film type, and even different ASA ratings of the same film, have different dye formulations and optical grain size. When scanned and printed at highly enlarged sizes from a finely focused film scanner, the film grain becomes apparent. This is typically seen as an optically visible interference or noise. When scanning at resolutions of 2000 dots per inch/78 dots per millimeter or higher; this phenomenon is caused by a mismatch between the scanner's optical digital sampling and focus with that of the analog grain of the film. No prior art has addressed this matter.

Consequently, the current state of the art for professionally demanding applications of digital scanners still has several outstanding problems:
  a) Photo scanning is a very subjective, user interpretive, time consuming, error prone, and expensive process.
  b) Color accurate digital scanning, calibrated to traditional film professional standards, is very difficult if not impossible for most people to perform.
  c) Negative films can generally not be used as a viable digital-imaging source.
  d) Professional scanner operators possessing the necessary color science and optical film knowledge are very difficult to find and expensive to employ.
  e) With growing industrial use of high quality and large format professional imaging output devices, they can visibly reproduce optical noise and even the sandpaper textures (optical granularity) of the original film when scanned.
  f) Due to the current state of the art, the professional image production photo, pre press, and motion picture industries expend substantial amounts of labor and money to digitally touch-up and correct inadequate quality photo scan captures.

SUMMARY

The invention is to automatically digitally scan all types of film, photo print media, and imagery at the combined optimized optical and spectral accuracy without human intervention.

OBJECTS AND ADVANTAGES

Accordingly, besides the time saving advantages of fully automatic image capture and scanning operations as described above, there are several objects and advantages of the present invention:
  a) To provide a photo image scanner capture capable of absolute duplication of the optical and color density quality of the original, without human interpretation or intervention.
  b) To provide an image media trained artificial intelligence scanner, which is pre-calibrated to professional standards.
  c) To provide a photo image scanner capable of accurately scanning all materials: negative film, transparency slides, silver halide photo and ink prints, etc.
  d) To provide a fully artificially intelligent color image scanner, that can be used by typical users, and still obtain the imaging industry's highest quality photo image capture.
  e) To provide a photo image scanner where the maximum optical analog film quality is maintained or even enhanced by image scanning, not degraded or made to extenuate film noise artifacts.

Further objects and advantages are to provide a synergistic harmony between the physical digital properties and characteristics of the scanner ability, and the comparable analog properties and characteristics of a photo media - spectral density, grain size, exposure and color response.

It is further the object of this invention to create and maintain a learned knowledge database of film media and scanner equipment optical and color fidelity physical properties. This includes photo and print paper, as well as negative and positive transparency materials, and scanners of all varieties, drum PMT, linear and flatbed, fly spot PMT scanners, and matrix array cameras.

It is further the object of this invention to compute, in real-time during a scan, the unique optical sampling and color correction required by the film being scanned. Applying a dynamically determined correction, as necessary, over the entire spectral response curve of the stored standard film media properties, performs this function.

It is further the object of this invention to dynamically accommodate the optical address-ability of the subject being scanned, including film media grain with the media optical database definition and optimal selection of the scanner equipment device-dependent properties, including aperture lens and sensor array controllability.

It is further the object of this invention to provide maximum optical digital capture of the photo. This is performed by the means of automatic digital sampling of the film media at a sample rate comparable to the maximum optical sample size relative to the physical analog film grain size. This process is applicable to continuous tone film media, screen size for ink-printed media, and other sources.

It is further the object of this invention to not use log exponential, linear, or mathematic gamma color correction curves, but rather, to utilize exclusively the actual physically derived and sensed complex media specific film dye density curves for media color correction standards.

It is further the object of the invention to detect the need for tone correction via presampling of the film and comparing the measured density and intensity values to high fidelity film media specific standard density values pre-stored in media knowledge bases.

It is further the object of this invention to pre-sample scan data, utilize density to intensity and histogram analysis to compute curves of control color points, select the closest match media standard characteristic, and to adjust as required the state of the film media database. Then, based on this process, to use the current state of standard media correction for the scan.

A significant distinguishing advantage of the invention is that, in addition to the labor savings of automatic unattended photo-correct scanning; vast cost savings are derived from avoiding the need for post-production image correction and clean up of bad scans.

Even further objects and advantages will become apparent from a consideration of the ensuing description and drawings.

DRAWING FIGURES

FIG. 1 is the overview of the photo image scanner apparatus according to the first embodiment of the present invention.

FIG. 2 Is flowchart of the scanner control operation.

FIG. 3 Is block diagram showing the method for calibration standardization of media and scanner device properties.

FIG. 4 is a photo media and scanner calibration standardization target.

FIG. 5 is software listing of an example photo media property record.

FIGS. 6a to 6c is software listing of an example scanner device dependent property record.

FIG. 7 is a flowchart of the media custom correction process.

DESCRIPTION

A preferred embodiment of the scanner automatic control, which implements the methods and apparatus of the present invention, is referenced in FIG. 1. Where an industry standard PC or equivalent computer system 10, including a keyboard, color display, central processor, memory, data storage, pointing device, and device interfaces is supporting an image scanner. Device interfaces supporting the scanner and other recorder, instrument, and printer devices are provided by communication links 12. The Image Scanner Device 14, can be any ROB high definition image scanner, CCD, PMT, CMOS, flatbed, drum, camera etc. The computer processor with appropriate implementation of software, which embodies the preferred implementation of the invention, provides Scanner Control 16. Scanner Control utilizes artificial intelligence information derived by first sensing the current sample of photo media being scanned, and comparing and updating the current state of the Photo Media property knowledge base 22. In order to determine the optimum photo media properties of optical resolution, custom color compensation, and scanner sample rate for the media; the scanner device dependent criteria are then read from the Scanner Device Properties Configuration software 20 and compared for accommodating the current photo media's unique property requirements. The Photo Media custom requirements are matched to the available Scanner Device Properties and provided as control information to the scanner. A scan is then physically commanded where the scanner returns as raw data the highest optical and color fidelity correct scan possible for the both the scanner equipment and the media. The raw scanner data is formatted via the Data Manager 18 and the scan is recorded, stored, or passed (communicated) to other equipment.

In order to possess the knowledge to store in the Photo Media Properties and Scanner Device Properties database, it is necessary to have generated Calibration Standardization Data 22. This is accomplished by creation of photo standard optical exposure or analog printing of an image control standardized target as demonstrated in FIG. 4. The standardized Film Target is exposed or printed on all types of photo and print media including Transparency positive (photo chrome), transparency negative, photo dye print and screened ink print media. Differing from other color targets, some of the unique inventive features of FIG. 4 include separate blue (columns 19 & 12), green (columns 18 &11), red (columns 17 & 10), neutral (column 16), yellow (columns 15 & 9), magenta (columns 14 & 8), and cyan (columns 13 & 7) color swatches, which vary in equal densities between 3% to minimum density (swatches 13A to 19A) to their respective fully saturated primary color (row L), and then back to the maximum density of each of the respective primary high colors (swatches 7A to 12A). Additionally, each equal density step value of neutral gray is presented with the same comparable dye densities to each of the individual primary colors. Each horizontal row contains the same density control aim points for each of the seven individual color channels.

This invention differs from prior art in the other industry standard color targets like the KODAK Q60 and ISO standard IT8 committee chart. These types of targets contain no density information in individual color channels between the fully saturated primary color and black or Dmax. They therefore, do not include half of the color spectral density space, as well as the color interference data produced by cross color interference. Further, IT8 color targets are designed for positive print human perceivable color representations in ICC format. As a result, prior art omits any uniform media density representations of information for equal steps of density. Instead, they can only make more crude interpolative inference of dye density. It is critically necessary to include these design aspects of this invention in order to more accurately map the detail inverse color density space of negative film, as well as to increase the accuracy of data representatives of shadow detail toward black of other high fidelity positive photo quality media. Further, it is also necessary to provide, in equal density steps, all primary color channels and neutral gray between maximum density black and minimum density white. This allows for the ability to utilize densitometer instrumentation with all photo media, including positive and negative, to provide full density space profiles.

All color swatches of FIG. 4 density data aim points are referenced to known American National Standards Institute PH2.19-1986 and ISO 512-1985 STATUS A and T densities for positive exposures and prints, and STATUS M densities for negative transparencies. These control points are checked and measured during preparation for the targets as they are produced on various photos and print media to ensure quality preparation as described above. The invention Standard Target additionally provides photographic samples of scenes created under specific color control operations for diagnostic validation purposes. One image is from a totally digital source with digital color compression 30. The second is an analog studio tungsten 3200° k. film exposure, and exclusively uses traditional chemistry based forms of preparation 32. The digitally prepared portrait 30 is a YCC color space format portrait with digital video log color gamma. This portrait will posterize in color (adjacent pixels with similar values turn to the same color) if the integrity of shadow and highlight detail of the photo media image capture are not strictly maintained.

The photo image 32 is a traditionally prepared positive transparency Silver Halide E-6 chemistry scanned image of a shell. This pictorial item has more latitude of color than the first and is utilized as a diagnostic tool to demonstrate principally color shifts in the saturated magenta, yellow and cyan color channels. The bottom target row 34 is of equal density steps of neutral gray between Dmin. white and Dmax. black. If errors in individual high fidelity color channels occur, color pollution or crossovers of dye density will be visible and measurable here. All aspects of overall color balance occur when image processing the target.

FIG. 3 describes the calibration standardization processes necessary to create the Photo Media Properties 22 and Scanner Device properties 20. The standard target F164 is exposed to film 40 and is measured with ISO standard status A, M or T densitometer instruments at controlled luminance temperatures of 2950° k., 3200° k., and 500° k. and viewed via a high-powered scale-equipped microscope 42. The same exposure target is scanned on the scanner 46, where the scanners resultant raw output data is then based on its position indexed 48 to corresponding intensity to known density value in process 44. Also, the measured data are normalized to value of 0–1 for all points on the target, then are referenced to the brightness/intensity RGB scanner values Dmax. (black) and Dmin., (white), and 18% densities (pure gray) are computed to determine the relevant scanner density range, white point, black point, and natural color curve. The resulting photo media specific properties are recorded in database 22. Additionally, using the optical photography industry United States Air Force 1954 Photo Optical Alignment Target, scans are made and measured for actual optical resolution, as returned from the scanner, for each mechanically native optical resolution available. This information is recorded with all other physical scanner attributes in the Scanner Device Dependent Properties 20.

The density control 44 processes and records media-measured densities and related indexed aim point intensities in normalized (values of 0 to 1.00000) density points to known scanner intensity returns. In this way, the scanner, through direct referenced calculations from these indexes, becomes an ANSI/ISO standard densitometer itself for data output from Density Control. The Calibration Standardization values are stored in the photo media properties 22 knowledge base for each media type wished to be processed. Negative film, photo paper, transparency film, slides, screened and printed materials are all characterized for color spectral response and optical accuracy in this way.

FIG. 5 describes an example Photo Media Properties record. Recorded information includes the Dmax., Dmin., and gray control points with the tri-stimulus color (RGB, CMY Lab, or XYZ), for each dye mask of the original media. The color system choice is dependent on the media type, negative or positive, reflective or transparency. FIG. 5 demonstrates an example of the invention for negative film transparency KODAK Gold Plus normal exposure film 70. The media group 72 represents that this is one of a group of characterizations for varying exposures, resolutions or alternative properties for the same media type. Grain 74 specifies the physically smallest individually measurable dye element making up the media when measured by a microscope scale. The example is in measured individual size, measured in microns. Densities 76 are the three separate color mask densities as measured by the type of sensitometry 78 in status M negative RGB density. The individual normalized color channels are prepared by the Calibration Standardization represented as previously pre-computed for the accurate intensity to density correction on an idealized basis as measured by both the calibrated media and a calibrated and normalized color space scanner. Item 80 defines the number of control aim points making up the actual photo density curve between media Dmax., at 0 and media Dmin., at 1 on each individual color channel. Each individual value then defines an idealized media input density value to a desired return intensity value from the scanner.

FIGS. 6a, 6b, 6c are collectively the scanner device dependent properties routine. The utility of this routine is to feed other processors the knowledge necessary to closely match the current image scanner device capabilities with the current media being scanned. The scanner identification for manufacturer 60 model, and type 62, allows basic information to be available to the process. Included are: the native mechanical resolutions sampling sizes, in English and Metric dimensions 64; optical number of visibility sizes (equivalent to a camera lens or aperture), and their specific sizes 66 as measured visible microns of light samples; full available scanner size 68; available digital address-ability of the scanner color system, as measured in bit depth of RGB; digital to analog converter and lookup tables 70; and, data available for return to the computer 72; scanner hardware media focus capability, e.g. multi-lens, contrast focus, fixed focus 74 format for raw data being received from the scanner interface 76.

FIG. 2 Scanner Control describes the production scanning image data acquisition process. The image acquisition process begins with the User Interface 92 selection type of scanner and the request to scan. The Acquisition Control and Initialization 96 obtains the selected scanner's characteristics from the user requested Scanner Device Properties 20 routine and then performs a high-speed pre-scan. The prescan data is fed back to be processed by the Media Custom Correction process 94. The Media Custom Correction process then requests from the Photo Media Properties 22 library the Calibration Standardization Properties for the current film type group or family. The Media Group includes a comprehensive library of photo media types and calibration properties for exposures that are at various levels of over, under, and normal exposure. The sample scan is processed via the Custom Media Correction 94 and FIG. 7, to compare and determine the closest photo media match in the current Media Properties knowledge base. Then, if necessary, the process computes a custom fit correction for the current film being scanned as a modification to the standard calibration properties. The optimized photo media properties requirements are then formatted for the specific available scanner specific parameters and given as control information in the Acquisition Control and Initialization process 96. Now pre-initialized with the optimized control parameters, optimized accurate scan data 98 is then returned directly from the scanner digital image capture.

FIG. 7 shows the Media Custom Correction process in detail. By first taking the Sample Scan 110 and performing a Histogram and Exposure Analysis 112, the histogram returns intensity values with the population (quantity) of the intensity of pixels found in the sample between the scanners white and black points. The histogram data array will be passed to the Create Intensity to Density Control Points 114 process. The histogram values are then converted to normalized values. The media or film white and black points will be determined by the high and low values of the histogram in each of the three-color channels. The 50% intensity point gray will be calculated based upon being the midpoint between the intensity value between the maximum intensity and minimum intensity of each red, green, blue scanner sample histogram channel. The green color channel, due to being the primary lumens color channel source, is then used as the density control definition index value. The results of the histogram analysis are then given to the Compare Select Media 116 function, which in-turn compares the green channel control points of white, black, and gray comparing for match within the available Media Groups. The closest match group is selected, then a comparison of all individual entries. If there is an exact selection match, it is defined and passed to the Scanner Color Lookup Table CLUT, DPI, and Aperture Control function 120.

If it is not an exact match with the closest fit photo media property settings, the Custom Color Match 118 then processes it. Here the selected photo media's idealized Color Control curve is computed for deviations from the samples corrected histogram control points. Offset differences are calculated for these differences in the same normalized (0–1) scale across the entire curve. The closest match Photo Media Properties Color Index Table is then modified by stretching, interpolating the original points of the index table or calibrated media correction to pass through the actual new scan sample control points. The result is that the deviation of exposures of this particular exposure now has an equivalent unique custom correction produced for it based on the pre-sample and the calibration standard. The custom color controls are then passed to the her CLUT, DPI, Aperture Control process 120 for optimized selection settings and scanner device dependent formatting 122.

CONCLUSION, RAMIFICATIONS, & SCOPE

Accordingly, the reader will see that color digital image scan capture of this invention is fully automatic and thus is easy to use, more accurate due to calibration and sampling than other methods, and provides the highest possible combined optical qualities of both traditional photography and digital scanner technologies.

It provides for digital scan quality that is limited only by the photo or the scanner, not the judgement or knowledge of an operator.

It provides for the automatic fine tuning optimization of digital photography.

It permits materials as photo negatives previously thought to be unsuitable for digital use to be effective tooling for demanding applications.

It permits scanners, once given a task, to operate unattended where they adapt themselves to the photo media and scene quality requirements.

It permits the scanner to operate as a photo calibrated (ANSI, ISO) standard densitometer and or colorimeter with even higher image qualities and accuracy than tradition photo film instrumentation.

Although the description above contains many specifications, these should not be construed as limiting the scope of the invention, but as providing illustrations of the presently preferred embodiments of the invention. For example, the photo image scanner can be embedded into a digital camera, where the image CCD array is acting as the scanner and an embedded processor with the appropriate software and storage performing the optimized self-adaptive scans. Thus, the scope of the invention should be determined by the appended claims and equivalents, rather than by the examples given.

What is claimed is:

1. A method of photo image capture and processing optimization providing fully automatic self-adapting capabilities comprising:
   a) a comprehensive photo image media knowledge database of physical property attributes including optical grain a and normalized color density response of various media types;
   b) a real-time self adaptive optical and color analysis method for selecting the proper media type, comparing and determining the optimum digital scan sampling of photography and media/scene balance scan requirements;
   c) method for matching the physical properties and characteristics of photography and media, to those of the image capture scanner equipment properties and characteristics.

2. A method or process for quality optimization of photo image capture and processing of media on scanners or digital camera equipment; via physical property characterization and their digital data representation, suitable for various types of photo media: negative film, positive chromatic transparency film, printed or artistic materials and real time scene balance and changes of exposure of those media; comprising of the multiple steps of:
   a) a step for a method to perform preprocess measurements and representation of the actual physical optical "spot size" optical address ability of both the digital scanner or capture equipment and the grain photo media being captured;
   b) a step for a method to perform standardized target preprocess representation and measurements for digital characterization and normalizing of the relationship between the range of color density response and specific density control aim points of the targeted photo media to be captured and the device dependent color range of a particular capture or scanner hardware;
   c) a step for a method to represent photo media and scanner device dependant properties characterization in computer data bases;
   d) a step for a method for separate standard measurement data representation of the capture device and media or scene dependant physical characterizations of actual optical address ability (as spot size and grain), high fidelity color density response in a plurality of simultaneous color channels (red, green, blue, magenta, yellow, cyan, neutral, and gray);
   e) a step for a means to relate the measured photo media specific physical density space (or range) in normalize density space, to the normalized intensity space (brightness range) of the available returned signals from a computer capture device or scanner, including the ability of the scanner and the computer thus being comparably calibrated according to ANSI and ISO densitometric physical media measurement standards;
   f) A step for a method of using a computer processor to receive scanner device dependant sensor response data of media or scene specific physical representations and to perform computations with the aid of media and device characterization databases to determine the necessary scanner control parameters to correct for and optimize for physical or scene specific requirements of over or under exposure, media resolution grain limitations, capture sensor data fidelity range and optical address ability deficiencies and errors.

3. An apparatus for image processing and capture utilizing neural intelligence adaptive means for design of a scanner and digital camera device to be optimized for image source optical and fidelity accuracy comprising:

a. means from a pre-sample of the media and processing of that pre-sample data from the capture device to determine the physical properties or nature of the media or scene being captured;

b. means of comparison of physical characterization properties of the media being captured to precise predetermined databases of detailed media and capture device characterization properties;

c. determination means using neural intelligence for selecting a media from a database and determining corrections for capture device control necessary to optimize media correction as part of the scan capture process;

d. means to avoid and manage media grain noise in scanning by use of spot size control;

e. physical capture means to separately control capture optical spot size from scanning resolution;

f. means to process the color matching density and intensity normalization of the range of the original source media to the fidelity range of the device performing the scan capture.

* * * * *